US008626353B2

(12) United States Patent
Ghosh et al.

(10) Patent No.: US 8,626,353 B2
(45) Date of Patent: Jan. 7, 2014

(54) INTEGRATION OF DEMAND RESPONSE AND RENEWABLE RESOURCES FOR POWER GENERATION MANAGEMENT

(75) Inventors: Soumyadip Ghosh, Peekskill, NY (US); Jayant R. Kalagnanam, Tarrytown, NY (US); Dmitriy A. Katz-Rogozhnikov, Ossining, NY (US); Mark S. Squillante, Pound Ridge, NY (US); Xiaoxuan Zhang, Stony Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 13/085,049

(22) Filed: Apr. 12, 2011

(65) Prior Publication Data

US 2012/0185106 A1   Jul. 19, 2012

Related U.S. Application Data

(60) Provisional application No. 61/432,959, filed on Jan. 14, 2011.

(51) Int. Cl.
*G05D 3/12* (2006.01)
*G05D 13/02* (2006.01)
*G06F 17/50* (2006.01)
*G06F 7/48* (2006.01)
*G06Q 10/00* (2012.01)
*G06Q 40/00* (2012.01)

(52) U.S. Cl.
USPC ............... 700/291; 700/28; 700/32; 700/286; 700/297; 703/1; 703/3; 705/7.31; 705/37

(58) Field of Classification Search
CPC .................................. Y04S 50/10; H02J 3/32
USPC ................. 700/28, 32, 33, 36, 286, 291, 297; 703/1, 3; 705/7.31, 10, 37
See application file for complete search history.

(56) References Cited

U.S. PATENT DOCUMENTS 8,359,124 B2 * 1/2013 Zhou et al. ............... 700/291
2010/0179704 A1 * 7/2010 Ozog ......................... 700/291
(Continued)

OTHER PUBLICATIONS

Bhattacharya et al., "Real Time Optimal Interruptible Tariff Mechanism Incorporating Utility-Customer Interactions," IEEE Transactions on Power Systems, vol. 15, No. 2, May 2000, pp. 700-706.

(Continued)

*Primary Examiner* — Kavita Padmanabhan
*Assistant Examiner* — Darrin Dunn
(74) *Attorney, Agent, or Firm* — Scully, Scott, Murphy & Presser, P.C.; Daniel P. Morris, Esq.

(57) ABSTRACT

System and method of solving, in a single-period, an optimal dispatching problem for a network of energy generators connected via multiple transmission lines, where it is sought to find the lowest operational cost of dispatching of various energy sources to satisfy demand. The model includes traditional thermal resources and renewable energy resources available generation capabilities within the grid. The method considers demand reduction as a virtual generation source that can be dispatched quickly to hedge against the risk of unforeseen shortfall in supply. Demand reduction is dispatched in response to incentive signals sent to consumers. The control options of the optimization model consist of the dispatching order and dispatching amount energy units at generators together with the rebate signals sent to end-users at each node of the network under a demand response policy. Numerical experiments based on an analysis of representative data illustrate the effectiveness of demand response as a hedging option.

21 Claims, 10 Drawing Sheets

(56) References Cited

U.S. PATENT DOCUMENTS

| | | | |
|---|---|---|---|
| 2010/0332373 A1* | 12/2010 | Crabtree et al. | 705/37 |
| 2011/0106328 A1* | 5/2011 | Zhou et al. | 700/291 |
| 2012/0010758 A1* | 1/2012 | Francino et al. | 700/291 |
| 2012/0130556 A1* | 5/2012 | Marhoefer | 700/291 |

OTHER PUBLICATIONS

Office Action dated Jun. 28, 2013 received in a related U.S. Appl. No. 12/890,119.

* cited by examiner

INTEGRATION OF DEMAND RESPONSE AND RENEWABLE RESOURCES FOR POWER GENERATION MANAGEMENT

CROSS REFERENCE TO RELATED APPLICATIONS

This application relates to commonly-owned, co-pending U.S. patent application Ser. No. 12/890,119 entitled SYSTEM AND METHOD FOR LOWEST COST AGGREGATE ENERGY DEMAND REDUCTION, the whole contents and disclosure of which is incorporated by reference as if fully set forth herein.

The present invention relates generally to smart grid technologies as it pertains to managing the generation, distribution and usage of energy, and, more particularly, to system and method for controlling the dispatching of energy (e.g., committed regular generation units) over an energy distribution network to customers that integrates demand response and availability of renewable resources for power generation management.

BACKGROUND

With the advent of the Smart Grid that provides an infrastructure for energy supply (e.g., electricity) generation and transmission for delivery from suppliers to consumers under control of digital communications, the ability to access real-time information on supply availability and prices supported by demand offers unique opportunities to improve the overall efficiency of the energy grid in terms of both long-term supply-demand management and near-term dispatching of diverse generation facilities to meet current demand. The responsiveness and flexibility envisioned for the Smart Grid provide additional advantages in facing the significant new challenges of integrating distributed and intermittent generation capability, such as small-scale generators and renewable energy sources (wind, solar, etc.), at a scale that current grid technology simply cannot achieve. This is becoming more critical as renewable energy technologies are playing an increasingly important role in the portfolio mix of electricity generation.

Currently, only a few published methods exist that considers dispatching policy with distributed renewable generation (e.g., wind energy). However, the industry has yet to produce a system or method that performs integrating renewable generation and demand response together into power generation management and risk control.

That is, existing utility generation dispatching policies do not integrate demand response for risk management.

It would be highly desirable to provide a system and method that achieves improvements in both total financial measures and risk control over existing mechanisms that do not consider virtual generation (demand response) and distributed intermittent generation (renewable sources).

SUMMARY

System and method for determining optimal dispatching policy of aggregate energy generation capacity while integrating consideration of renewable resources and demand response program at one or more electricity network levels such as an energy generation and distribution network.

The system and method when implemented by an electricity generation utility helps optimize their total financial performance by providing options for hedging against energy shortfalls with intelligent responsive dispatching of various energy sources including renewables (e.g., wind, solar, thermal, etc.) and a "virtual" generation source of incentivized demand reduction from end-users (a "Demand response").

In one aspect, the system and method performs solving, in a time period(s), an optimal dispatching problem for a network of one or more energy utilities connected via multiple transmission lines, and in connection with a configured microprocessor(s) of a computing system, generate solutions enabling choices for utilities to achieve find a lowest operational cost dispatching of various energy sources to satisfy demand. The model includes traditional thermal resources and renewable energy resources available generation capabilities within the grid.

In a further aspect, the method considers demand reduction as a virtual generation source that can be dispatched quickly to hedge against the risk of unforeseen shortfall in supply. Demand reduction is dispatched in response to incentive rebate signals sent to consumers.

In a further aspect, an optimization model is generated and solutions provided that includes control options including: the dispatching order and dispatching amount of the thermal generators together with the rebate signals sent to end-users (e.g., incentives to residential customers to increase the energy efficiency of their homes) at each node of the network under a simple demand response policy.

Accordingly, there is provided a system, method and computer program product for managing dispatch of energy for distribution to customers of an energy utility, the method comprising:

receiving, at a processor device, configuration data of an energy distribution network including at least one energy generator for generating energy units, and generator busses carrying energy units dispatched from the generators to customers via transmission lines, receiving, at a processor device, data representing a renewable energy source injected for power generation on one of the generator busses;

specifying decision variables for controlling a dispatching of energy units from energy sources over the network and a total power extracted at connected generator busses over the network in a defined time period;

specifying a set of optimization constraints including a risk control constraint as a function of the decision variables, the configuration data and injected energy data;

formulating, via mixed integer programming at the processor device, an optimization problem having an a cost-based objective function representing an objective to minimize a total cost metric within an acceptable risk level;

solving, by the processing device, the optimization problem subject to the risk control constraint and set of optimization constraints, the objective and the cost-based objective function to jointly determine an optimal dispatching policy for generated energy units and an incentive rate for customers of a utility to extract load reduction from the customers total power at connected generator busses over the network in the defined time period that minimizes the total cost metric within the acceptable risk level; and, outputting the dispatching policy and incentive rate for adoption by an utility to control energy dispatch and customer demand response.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

Figure 1:
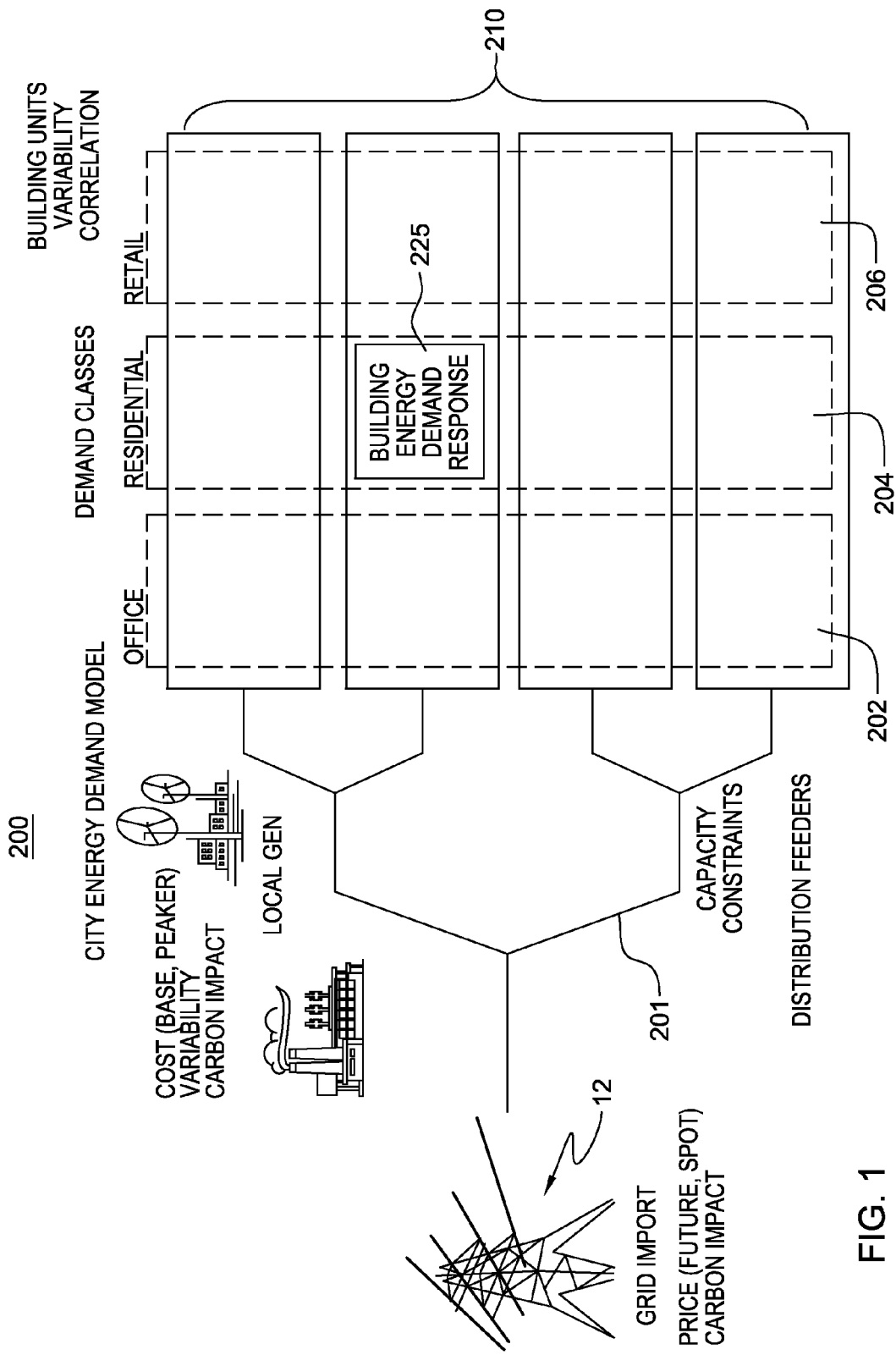
FIG. 1 depicts a schematic of all end users on a feeder network 201 where each user has a price elasticity represented by the demand response curves.

In view of FIG. 1, employed at the Smart Grid 12 is a computer implemented system and method for determining an optimal dispatching policy with integration of renewable resources and demand response program at multiple network levels such as generation and distribution networks including, e.g., distribution and feeder networks 200.

In an embodiment, the computer implemented system and method employs a model including an algorithm for determining an optimal dispatching policy for electricity generation utilities. This model accounts for: 1) intermittency and volatility of renewable generations; 2) for heterogeneous customer flexibility in load reduction; 3) for non-discriminate incentive pricing for customers; and, 4) can account for hedging risks with demand response for generation utilities with renewable resources.

More particularly, a method includes a computer-based system applying a model that incorporates risk-based control in the short-term economic dispatching of energy generation capacity including distributed renewable energy sources and demand response together with physical constraints on transmission of energy through the distribution network. Examples of dispatchable energy sources include traditional thermal, distributed generation, etc.

The method jointly determines an optimal dispatching policy for generation (thermal, renewable etc.) and an incentive rate for customers of the utility to extract load reduction from them.

In additional embodiments, the method accounts for one or more of: intermittency and volatility of renewable generations; heterogeneous customer flexibility in load reduction; non-discriminate incentive pricing for customers; hedging risks with demand response for generation utilities with renewable resources, etc.

Figure 2:
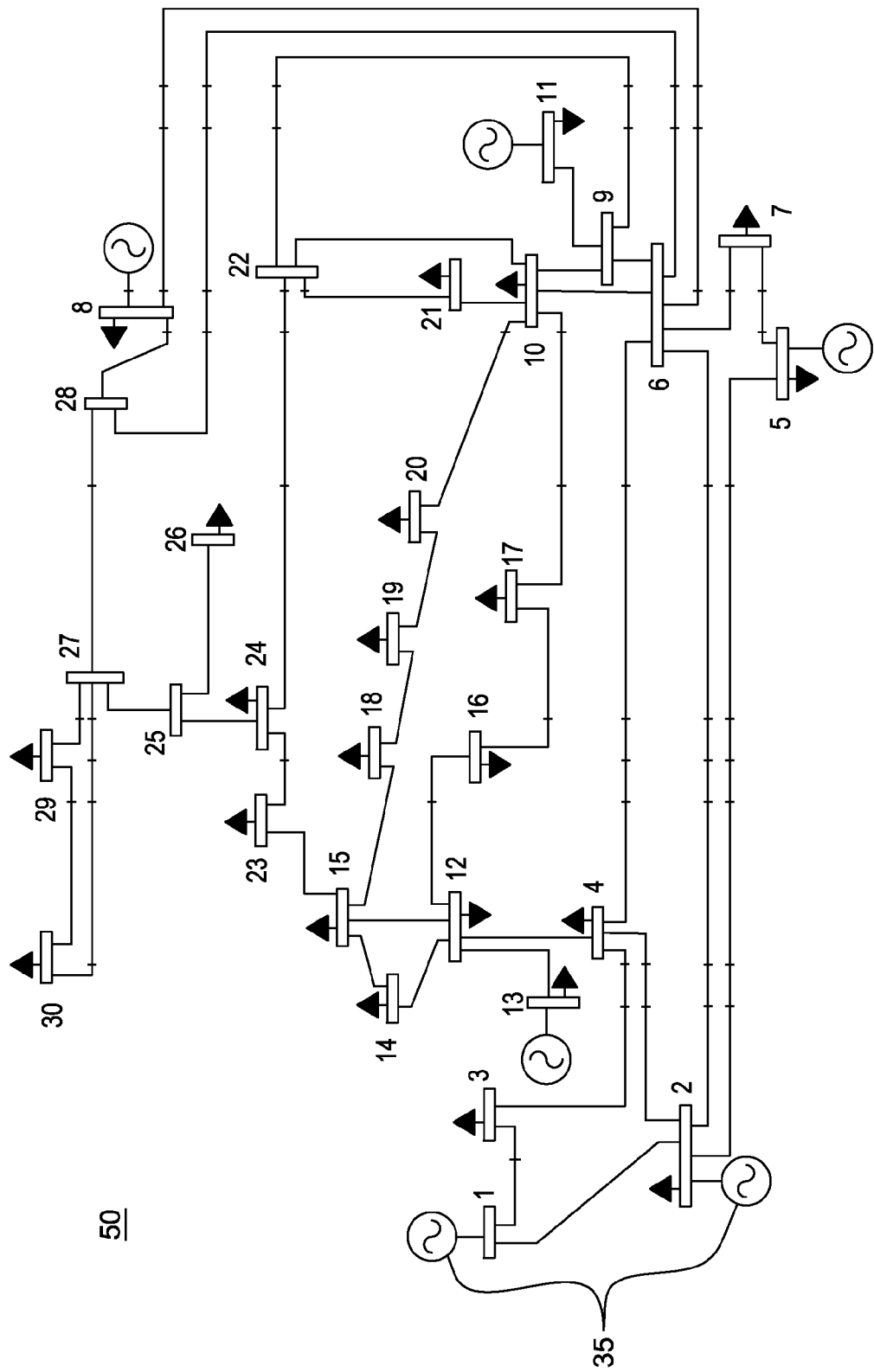
FIG. 2 depicts an example IEEE 30-bus 6-generator system topology for which the present system and method may be implemented in accordance with one embodiment.

As shown in FIG. 1, an electric utility controls the dispatching of committed (regular and peaker) generation units (thermal sources) over a network of multiple local buses interconnected via transmission lines. For example, FIG. 1 particularly depicts a schematic of all end users on an example feeder (energy distribution) network 200 where each user has a price elasticity represented by demand curves. As represented in FIG. 2, demand users include classes of customers such as offices 202, residential 204 (e.g., homes) and commercial 206, e.g., retail stores. A network of distribution feeders 201 import the power from grid 12 in response to the aggregated reactive and potential demand, and the utility provides power to the demand users, e.g., organized according to zones 210 corresponding to a respective demand class, for example. Thus, in one aspect, the system and method employing the model, is applied at multiple levels of the energy distribution hierarchies such as shown in FIG. 1 where the various levels at which the method can be applied include: across multiple classes of customers (demand) for a utility (e.g., office, residential, retail) within a grid of local generation; across multiple grids of local generation, e.g., within a city energy demand model; across multiple local generation distribution feeders; and so on within regional grids, across regional grids, within the national grid, across national grids (e.g., US and Canada). This generation including renewable energy sources (solar, wind, etc) may be modeled for a single period in fine or course time scale (~sec, Minutes, hours, days etc.) In the model described, class is an abstraction that allows the ISO/utility to differentiate among different groups of entities.

The methodology described accounts for heterogeneous customer flexibility in load reduction; and, a demand response 225 realized via a utility's rebate signal (not shown), as shown in FIG. 2.

Accordingly, in the description of the method, and provided as inputs to a programmed computer, there is defined:
$N_g$ is number of traditional generator buses;
$N_d$ is the number of load buses;
$N$ is the total number of buses; and,
$P^{d_i}$ is the power demand at each (load) bus.

In one embodiment, an assumption is made that power demand $P^{d_i}$ at each bus "i" is normally distributed, $P^{d_i}$:$N(\mu_i, \sigma_i^2)$. This assumption is typically used in stochastic Optimal Power Flow (OPF) models, and in particular fits in well with a demand response model to be used.

The $N_g$ generators are peak generators, namely active generators that are currently unused but spinning and thus can be activated within a short time span, e.g., on the order of minutes. Let $P_{g_i}^{min}$ and $P_{g_i}^{max}$ represent the lower and upper bounds on the power outputs from generators i, i=1, ..., $N_g$. Let $\theta_i^{min}$ and $\theta_i^{max}$ represent the lower and upper bounds on the voltage phase angles of bus i, i=1, ..., N (where i is representative of bus or generator).

It is further assumed that renewable generation is connected to a single bus such that the total power generated lies within $P_{RN}^{min}$ and $P_{RN}^{max}$, where the forecasts are $P_{RN}$: (truncated) $N(\mu_{RN}, \sigma_{RN}^2)$ i.e., the values of the normally distributed random variable cannot be negative. Other renewable resources share similar intermittent and volatile properties with wind and can be modeled in this manner. It is further assumed that the utility also integrates a demand-response policy as a source of virtual generation, where M of the buses offer rebates to customers for reduced energy load. This can be implemented by allowing the utility to interact with different household electric appliances (laundry, temperature control, etc.) through price signals sent to smart meters as is known in the art ([e.g., http://www.smartmeters.com/the-news/617-us-northwest-perfect-for-smart-grid-rollout.html). The customer response to these incentives is a reduced demand $P_{DR_j}(r)$ with a mean and variance depending on the rebate value r, $P_{DR_j}(r):N(\mu_{DR_j}(r), \sigma_{DR_j}^2(r))$, j=1, ..., M with j representing a bus subject of the load reduction. In example numerical experiments, the mean value of the demand response, $\mu_{DR_j}$, is linear in the rebate value:

$$\mu_{DR_j} = b_1 r, j=1, \ldots, M. \quad (1)$$

Finally, any excess (shortfall) of supply is sold to (bought from) the spot market at a unit price c.

In the following, the subscripts $_{RN}$ and $_{DR}$ are used to indicate connections with wind generation (renewable energy) resource and demand response, respectively. In one embodiment, it is assumed that the total demand, demand response and wind power generation are mutually independent random processes.

In one embodiment, the model includes formulating an optimization problem with the following decision variables:

$z_i$ is a 0/1 indicator of whether traditional generator i is on or off, i=1, ..., $N_g$;

$P^{g_i}$ is a total real power output extracted from generator bus i, i=1, ..., $N_g$;

$\theta_i$ is a voltage phase angle for each bus i, i=1, ..., N;

r is a non-discriminate unit rebate price offered to all customers on the M participating busses.

It is noted that $\{z_1\}$ are discrete control variables, while all the other decision variables are continuous. As for the continuous control variable r, the utility is assumed to have the forecasting profiles of each type of load reduction.

Constraints

In one embodiment, the problem is formulated as a single-period, nonlinear Mixed Integer Program (MIP) and can be solved using Optimization Subroutine Library OSL, CPLEX® (registered trademark of CPLEX Optimization, Inc. By single period, the optimization is run once, and the period may be of any time scale, e.g., minutes. Further, the optimization is adapted/expanded to multiperiod, analogous to optimization provided in herein-incorporated Ser. No. 12/890,119. In the model employed, a real power generation $P^{g_i}$ of each generator bus, the load demand $P^{d_i}$ of each load bus, and the voltage phase angles $\theta_i$ of each bus lie within their minimum and maximum limits. In addition, the total generation load plus the reduced load balance the total demand. This therefore results in the following bounding constraints:

$$z_i P_{g_i}^{min} \leq P^{g_i} \leq z_i P_{g_i}^{max}, i=1, \ldots, N_g; \quad (2)$$

$$\theta_i^{min} \leq \theta_i \leq \theta_i^{max}, i=1, \ldots, N; \quad (3)$$

$$b \ 0 \leq r < c; \quad (4)$$

$$0 \leq P_{DR} \leq P_{DR}^d; \quad (5)$$

where the last constraint restricts the total demand-response load (variable $P_{DR}$) to be no more than the load of the hosting bus (variable $P_{DR}^d$), where $P_{DR}^d$ refers to total demand at the bus.

Further, in one embodiment, the formulation imposes power flow balance constraints on the decision variables. For this economic dispatching problem, the DC power flow constraints commonly used in optimal power flow and economic dispatch problems, are used as set forth in equation 6):

$$P_i(\theta) = P_i^g - P_i^d = \sum_{j=1}^{N} \frac{1}{x_{ij}} (\theta_i - \theta_j), \quad (6)$$

where $x_{ij}$ is the reactance of the transmission line between bus i and bus j. The generator bus injected with renewable energy source, e.g., wind power, has a real load output of $P^{g_i}+P_{RN}$. The generator bus with demand response options has a real load output of $P^{g_i}+P_{DR}$, and the generator bus with access to the spot market has a real load output of $P^{g_i}$ plus (minus) the amount of load bought from (sold to) the market.

Power balance also has to be achieved at the system level:

$$\sum_{i=1}^{N_g} P_i^g + P_{RN} + P_{DR} + S = \sum_{i=1}^{N} P_i^d, \quad (7)$$

where S represents the load position in the spot market. This results in:

$S=\sum_{i=1}^{N} P^{d_i} - \sum_{i=1}^{N_g} P^{g_i} - P_{RN} - P_{DR}$, which, if positive, represents a shortfall in supply and, if negative, represents an excess of supply sold to the spot market on a particular bus.

Risk Control

For a loss value l(u;v), which is a cost function of decision variables u and random variables v (e.g., representing realized demand, generation from renewable energy sources), the β-Value-at-Risk (the β-quantile of the distribution induced on the loss function. The risk measure β-Conditional Value-at-Risk with confidence level β is defined as the expected value of the cost-based loss function l(u;v) conditional on loss being beyond the β-th quantile. The β-VaR and β-CVaR values are denoted as $\alpha_\beta(u)$ and $\phi_\beta(u)$, where $$\alpha_\beta(u) = \min\{L_0 \in R: \text{Prob}\{l(u;v) \leq L_0\} \geq \beta\}, \quad (8)$$

$$\phi_\beta(u) = E[l(u;v)|l(u;v) \geq \alpha_\beta(u)] \quad (9)$$

It has been noted that CVaR is a coherent risk measure; moreover, it is a convex function of the decision variables. The model may consider CVaR as the risk measure for the power generation portfolio. For example, let L be a pre-specified risk (loss) level. Then the risk control constraint is formulated as $\phi_\beta(u) \leq L$, which can be transformed to the following equivalent formulation under the assumption, in one embodiment, that v is normally distributed:

$$\mu(u) + (\sqrt{2\pi}(1-\beta)e^{[erf^{-1}(2\beta-1)]^2})^{-1}\sigma(u) \leq L, \quad (10)$$

$\mu(u)=E[l(u;v)]$, $\sigma(u)=\text{Var}(l(u;v))$, and error function:

$$\text{erf}(z) = \frac{2}{\sqrt{\pi}} \int_0^z e^{-t^2} dt. \tag{11}$$

When v has a general distribution, the CVaR constraint can be approximated by sampling a collection of K paths, with $v_1, \ldots, v_K$ generated from the probability distribution of v:

$$L_0 + \frac{1}{J(1-\beta)} \sum_{k=1}^{K} (l(u, v) - L_0)^+ \leq L. \tag{12}$$

There is further defined the cost function $l(z, P^g, r, \theta; P^d, P_{DR}(r), P_{RN})$ as a function of decision variables $z \in R^{N_g}$, $P^g \in R^{N_g}$ and r, and random variables $P^d \in R$, $P_{DR}(r) \in R^M$ and $P_{RN} \in R$. In the model, the loss function (total cost) equals the sum of all the generation costs minus the total revenue from the load position exposed to the spot market (positive when selling to the market and negative when purchasing from the market).

In one embodiment, it is assumed a production cost $f_i$, $i=1, \ldots, N_g$, for those operating units, e.g., generators, to be a quadratic function of the amount dispatched, namely $$f_i = a_{2i} P^{g_i^2} + a_{1i} P^{g_i} + a_{0i}. \tag{13}$$

Where total real power output extracted from generator bus i is $P^{g_i}$. In addition, for example, it may be supposed that the start-up cost for load reduction is zero and that this virtual generator only incurs a "generation" cost linear in the rebate r. In general, there is no operational cost for wind renewables. Thus, the following form for the loss function is had in terms of the utility's total cost:

$$l(z, P^g, r, \theta; P^d, P_{DR}(r), P_{RN}) = \sum_{i=1}^{N_g} z_i \left( a_{2i} P_i^{g^2} + a_{1i} P_i^g + a_{0i} \right) + \tag{14}$$

$$r \sum_{j=1}^{M} P_{DR_j}(r) - c \left( \sum_{i=1}^{N_g} z_i P_i^g + \sum_{j=1}^{M} P_{DR_j}(r) + P_{RN} - \sum_{i=1}^{N} PD_i \right).$$

The mean and variance of the loss induced by the random variables $P^d$, $P_{DR}(r)$ and $P_{RN}$ are functions of z, $P^g$ and r. That is:

$$E[l(z, P^g, r, \theta; P^d, P_{DR}(r), P_{RN})] = \tag{15}$$

$$\mu(z, P^g, r, \theta) = \sum_{i=1}^{N_g} z_i \left( a_{2i} P_i^{g^2} + a_{1i} P_i^g + a_{0i} \right) +$$

$$r \sum_{j=1}^{M} \mu_{DR_j}(r) - c \left( \sum_{i=1}^{N_g} z_i P_i^g + \sum_{j=1}^{M} \mu_{DR_j}(r) + \mu_{RN} - \sum_{i=1}^{N} \mu_i \right);$$

$$\text{Var}[l(z, P^g, r, \theta; P^d, P_{DR}(r), P_{RN})] = \tag{16}$$

$$\sigma^2(z, P^g, r, \theta) = (r^2 + c^2) \sum_{j=1}^{M} \sigma_{DR_j}^2(r) + c^2 \left( \sum_{i=1}^{N} \sigma_i^2 + \sigma_{RN}^2 \right).$$

The formulation of the model is now provided. An objective of the formulation is to minimize the total cost (loss function), which yields a final formulation:

$$\min_{z, P^g, r, \theta} E[l(z, P^g, r, \theta; P^d, P_{DR}(r), P_{RN})], \tag{17}$$

s.t (2) – (7) and (10), $$z_i = 0 \text{ or } 1, i = 1, \ldots, N_g. \tag{18}$$

Thus, in one aspect, the model addresses the impact that the unpredictable nature of renewable generation has on the network dispatching problem; and further addresses that demand response in the form of offering energy reduction incentives (rebates) is effective to control this stochasticity.

Figure 11:
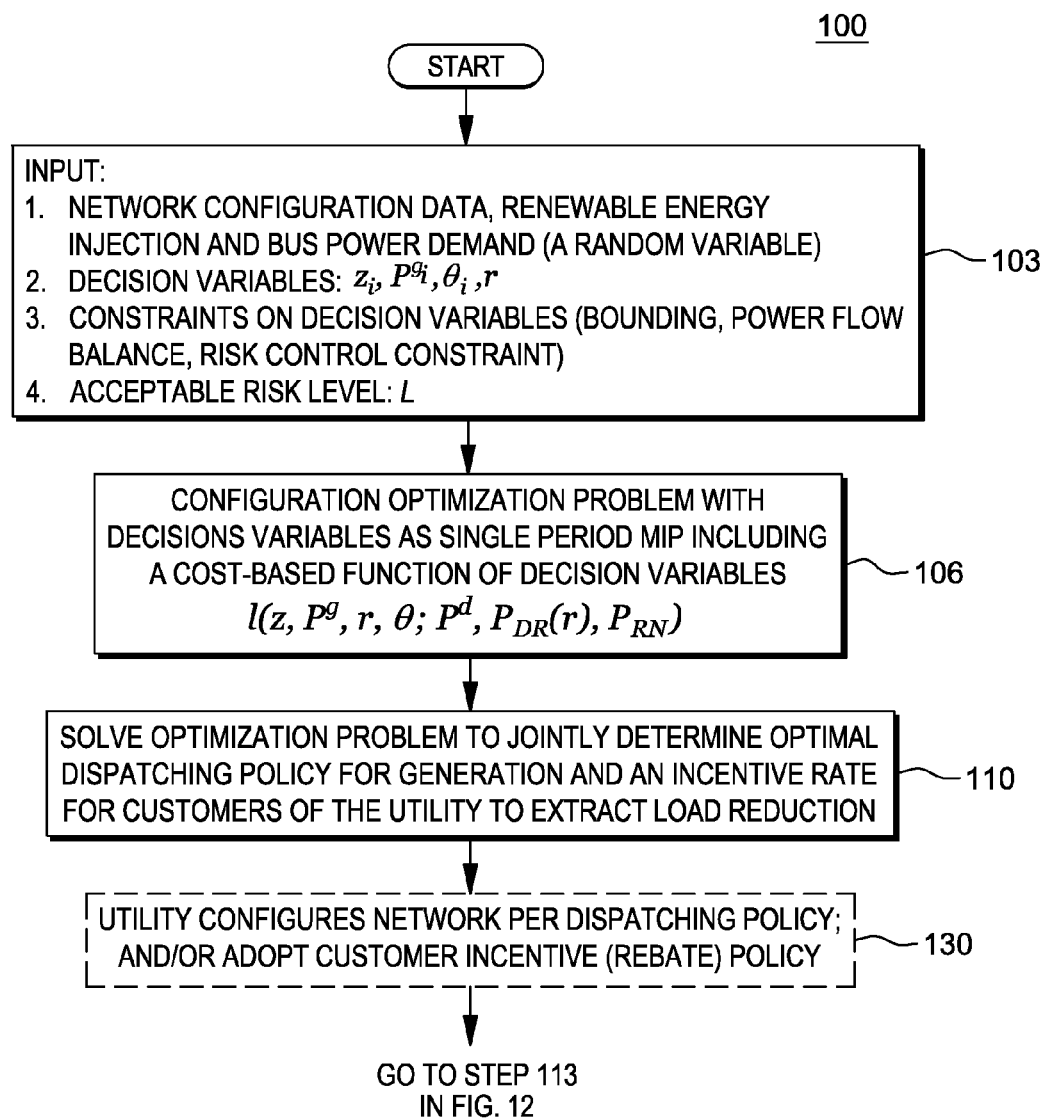
FIG. 11 depicts a computer-implemented method for managing dispatch of energy over a network according to one embodiment.

FIG. 11 depicts a computer-implemented method 100 for managing dispatch of energy over a network according to one embodiment. As shown in FIG. 11, there is depicted the step of 103 of receiving from wired or wireless communications and/or accessing from a memory storage device, data representing the network configuration, any renewable energy injection, and bus power demand (a random variable). Further, there is received and or accessed, one or more decision variables: $z_i$, $P^{g_i}$, $\theta_i$, and, r. Further, there is received and or accessed, data representing the power flow constraints, decision variable bounding constraints, risk control constraints, including specified risk level value for CVar risk constraint. Then, at 106, there is performed the programming, as a single period MIP, of the optimization problem including the cost-based function $E[l(z, P^g, r, \theta; P^d, P_{DR}(r), P_{RN})]$ to be minimized which is a function of the decision and random variables. Then, at 110, there is performed solving the optimization problem to jointly determine optimal dispatching policy for generation and an incentive rate for customers of the utility to extract load reduction on one or more busses for implementation by the utility at step 130.

Towards this end, instances of the above nonlinear mixed integer program are solved. In the solution, many combinations of the specific values for the decisions variables are tested, and each combination requires a solution e.g., a linear or nonlinear optimization problem.

Figure 12:
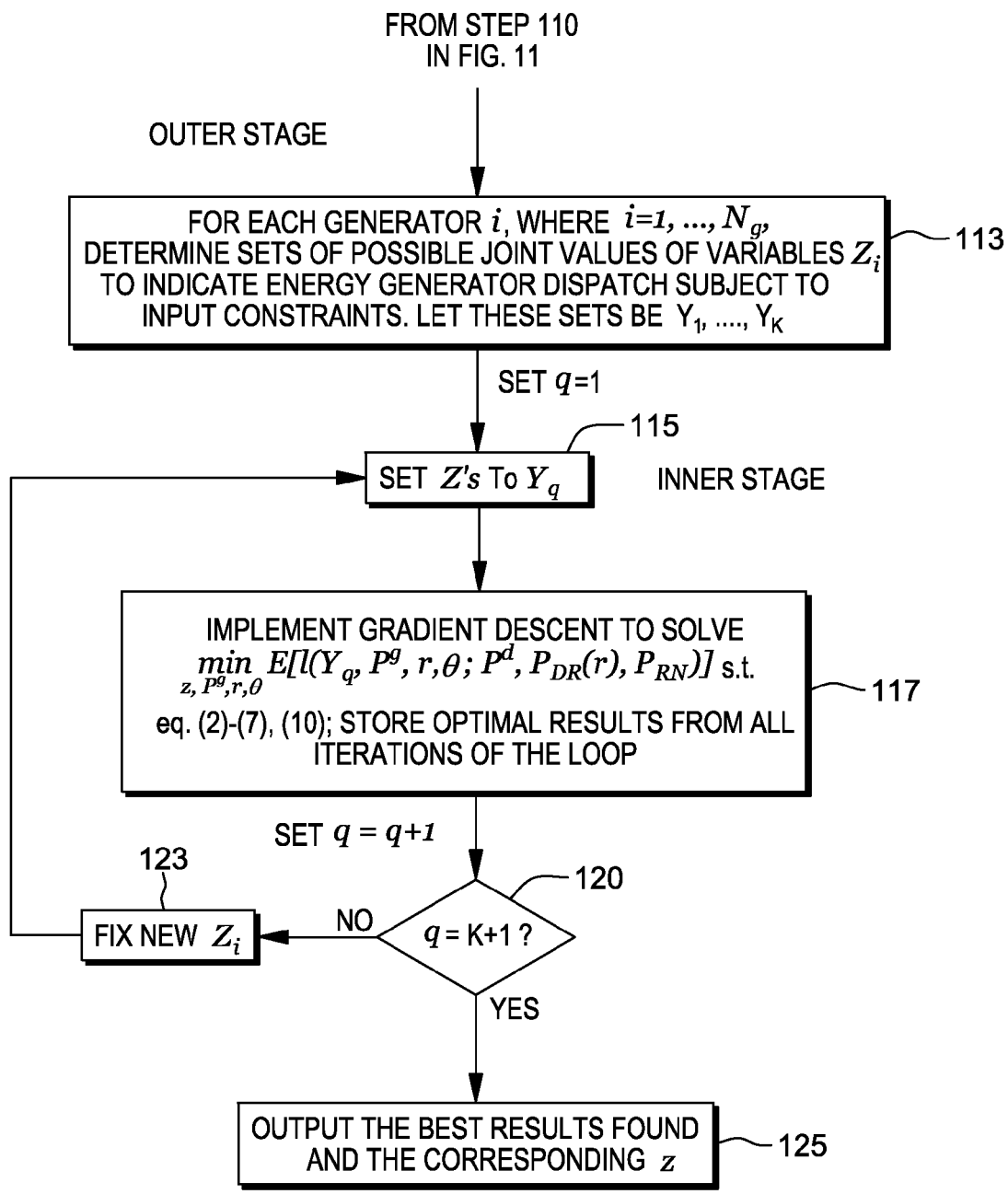
FIG. 12 depicts an example solution for said optimization problem implementing a two-stage procedure in one embodiment.

In one embodiment, FIG. 12 depicts an example method for solving said optimization problem indicated at step 110, FIG. 11, that implements a two-stage procedure: In the two-stage solution implemented: a first outer stage provides a listing of possible joint values of the binary variables $z_i$ $$(z \in R^{2^{N_g} \times N_g})$$

that indicate whether generator i is dispatched, and the inner stage where each $z_i$ has been fixed and the formulation simplifies to a non-linear formulation that is solved using a gradient descent algorithm given the expressions for the non-linear constraint of equation (10).

Thus, as shown in FIG. 12, at 113 there is depicted the step of determining sets of all possible joint values of variables $z_i$ to indicate energy generator dispatch subject to input constraints. These sets are denoted as sets $Y_1, \ldots, Y_K$ where K is a set limit. In the method depicted, for example, considering index q a variable set $Y_q$ represents a set of values of variables $z_i$'s for all i. For example, given a topology including 2 generators, $Y_1$ is $\{z_1=0, z_2=0\}$, $Y_2$ is $\{\{z_1=1, z_2=0\}$, $Y_3$ is $\{z_1=0, z_2=1\}$ and $Y_4$ is $\{z_1=1, z_2=1\}$. Then, after setting index q as q=1, the solution proceeds to step 115 where variables $z_i$ are replaced by elements of set $Y_q$. In the loop, a next step 117 represents the performing of a gradient descent algorithm wherein for the q=1 case, there is solved the $$\min_{z, P^g, r, \theta} E[l(z, P^g, r, \theta; P^d, P_{DR}(r), P_{RN})]$$

subject to constraints of eq. (2)-(7), (10). At step 117, any solution result from the gradient descent technique implemented may be stored in a memory storage device. Continuing in FIG. 12, the index q is incremented (i.e., by setting q=q+1) and the process proceeds to step 120 to determine if the limit last set $Y_K$ to be processed has been reached, i.e., whether q=K+1. In the example topology 50 of FIG. 2, six generators may represent K=64 ($2^6$) possible energy dispatch indicator combinations of (decision variables $z_i$). If a maximum number of $Y_K$ sets has not been processed, the loop processing continues by fixing a new $z_i$ (e.g., i is incremented) at 123 and returning to step 115 for performing the next gradient descent processing on the next set $Y_{q+1}$. If a maximum number of $Y_K$ sets has been processed as determined at step 120, then the process proceeds to step 125 to determine the particular $z_i$ and $Y_q$ set values providing the optimal solution result obtained over all the iterations are output/stored. That is, in one embodiment, the process includes, at each iteration, comparing each solution determined against solutions of all previous iterations of the loop, to track the most optimal $z_i$ and $Y_q$ set values.

In consideration of representative numerical experiments, the distribution network of an IEEE 30-bus 6-generator system topology shown in FIG. 2 was modeled. As shown in FIG. 2, the illustrative IEEE 30-bus 6-generator system 50 includes generators 35, and multiple generator busses (e.g., numbered busses 1, . . . , 30) operative interconnected with generators for carrying and distributing energy generated from the generators to customers via transmission lines (e.g. feeders such as shown in FIG. 1). Example parameter values for the quadratic cost function $a_0$, $a_1$, $a_2$ are provided as are the upper $P^{g^{max}}$ power bound and lower (power) bounds $P^{g^{min}}$ specified constraints for generator busses are provided in Table 1. Example voltage phase bounds $\theta^{min}$ and $\theta^{max}$ for all load busses are 0° and 30°, respectively.

TABLE 1

| Generator Unit Parameters for IEEE 30-Bus System | | | | | |
|---|---|---|---|---|---|
| Bus | $a_0$ | $a_1$ | $a_2$ | $P^{g^{max}}$ | $P^{g^{min}}$ |
| 1 | 0 | 2.00 | 0.00375 | 200 | 50 |
| 2 | 0 | 1.75 | 0.00175 | 80 | 20 |
| 5 | 0 | 1.00 | 0.00625 | 50 | 15 |
| 8 | 0 | 3.25 | 0.0083 | 35 | 10 |
| 11 | 0 | 3.00 | 0.025 | 30 | 10 |
| 13 | 0 | 3.00 | 0.025 | 40 | 12 |

A computing apparatus is programmed to solve the cost-based function of the model. The apparatus may use the optimization methods or optimization packages for solving Mixed Integer Programming problems, e.g., CPLEX®, results in solution outputs, i.e., decision variables.

Figure 3:
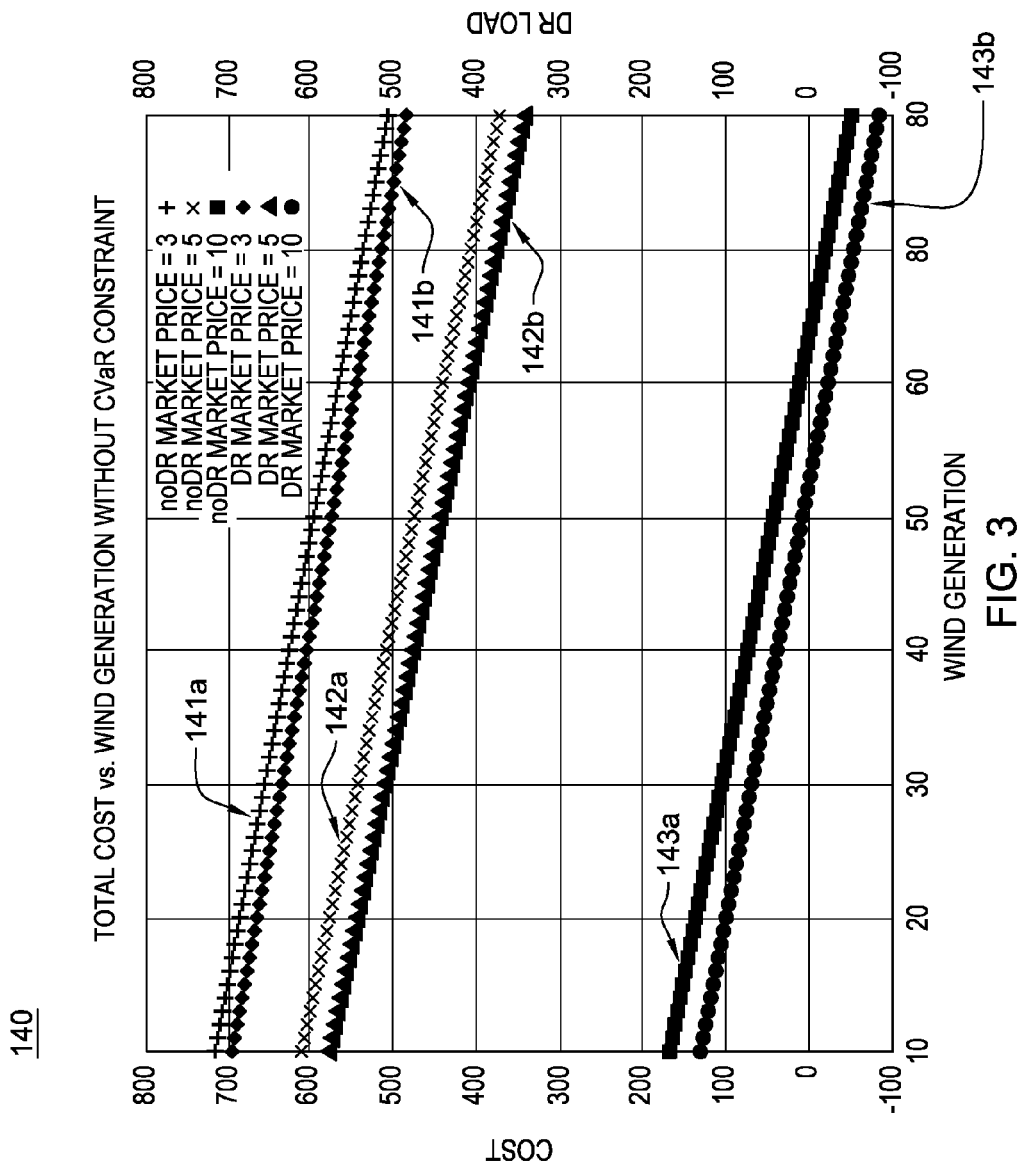
FIG. 3 depicts an example plot comparing Mean Loss vs. Wind with/without DR for example varying spot market price assumptions of a numerical experiment computed for example system topology of FIG. 2.

FIG. 3 is a plot 140 depicting, from solution results for the example topology 50 of FIG. 2, how the total expected cost when allowing demand response (DR) is lower than the total expected cost without DR for varying spot market price assumptions. That is, as shown in plot 140 of FIG. 3, the computed total cost when calculated without implementation of DR is represented as plots 141*a*, 142*a*, 143*a* when priced according to various spot market prices, and each is shown plotted at a decreased cost as represented by example plots 141*b*, 142*b*, 143*b* when calculated with implementation of DR. In addition, under relatively high spot market prices, if adopted, the utility can even realize additional profits through the use of DR, which can lead to more efficient overall management of the energy grid.

Table 2 compares the optimal dispatching policy, rebate price and spot market load position S (e.g., positive to buy and negative to sell), for different spot market price and wind generation assumptions, both with and without DR. From Table 2, it can be seen that when the market price is relatively low, wind injection into the system will not change the dispatching load nor the rebate price, and will only reduce the amount of load bought from the spot market. In one example embodiment, an optimal rebate price is about c/2. When the spot market price is relatively high, the utility dispatches more generation to realize a profit from this excess load. A dispatching order is inherent in the solution provided in results of Table 2.

From FIG. 3 plots 140 show how more wind injection under such conditions may reduce the dispatched thermal power and rebate price, which seems to result from the power flow constraints limiting the ability of the utility to transfer the excess generated load to the spot-market entry node. The optimal rebate price in this case is less than c/2. Under every condition, the total dispatched thermal generation is lower when DR is allowed.

TABLE 2

| Optimal Dispatching Without CVaR Constraint | | | | | | | | | |
|---|---|---|---|---|---|---|---|---|---|
| c | Wind | $P^g_1$ | $P^g_2$ | $P^g_3$ | $P^g_4$ | $P^g_5$ | $P^g_6$ | r | S | Cost |
| 3 | 15 | 133.3 | 35.7 | 16.0 | 0 | 0 | 0 | off | 83.4 | 700.2 |
| 3 | 15 | 133.3 | 35.7 | 16.0 | 0 | 0 | 0 | 1.5 | 68.4 | 677.7 |
| 3 | 45 | 133.3 | 35.7 | 16.0 | 0 | 0 | 0 | off | 53.3 | 610.2 |
| 3 | 45 | 133.3 | 35.7 | 16.0 | 0 | 0 | 0 | 1.5 | 38.4 | 587.7 |
| 5 | 15 | 200 | 58.9 | 23.4 | 35 | 17.8 | 19.4 | off | −86.1 | 593.8 |
| 5 | 15 | 196.4 | 53.5 | 22 | 33.4 | 14.3 | 16.2 | 1.81 | −85.5 | 559.7 |
| 5 | 45 | 188.3 | 51.9 | 21.6 | 30.6 | 13.3 | 15.2 | off | −82.5 | 488.7 |
| 5 | 45 | 178.9 | 50.1 | 21.1 | 27.2 | 12.1 | 14.1 | 1.75 | −82.8 | 457.5 |
| 5 | 80 | 167.6 | 47.9 | 20.6 | 23.2 | 10.7 | 12.8 | off | −82.5 | 372.0 |
| 5 | 80 | 158.2 | 46.1 | 20.1 | 19.9 | 10 | 12 | 1.68 | −79.7 | 343.2 |
| 10 | 80 | 126.4 | 53.9 | 25.8 | 35 | 21.4 | 30.0 | off | −88.9 | −52.5 |
| 10 | 80 | 115.0 | 51.7 | 25.2 | 35 | 19.9 | 28.6 | 1.78 | −89.8 | −84.8 |

Figure 4A:
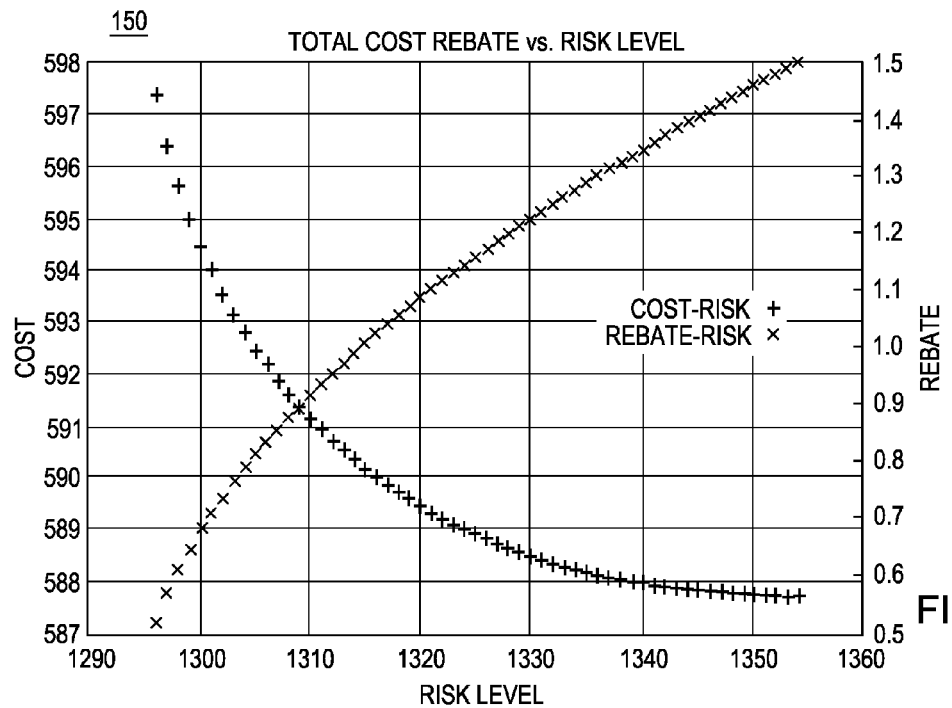
FIG. 4A shows an example plot of Cost & Rebate Load vs. Risk Level
Figure 4B:
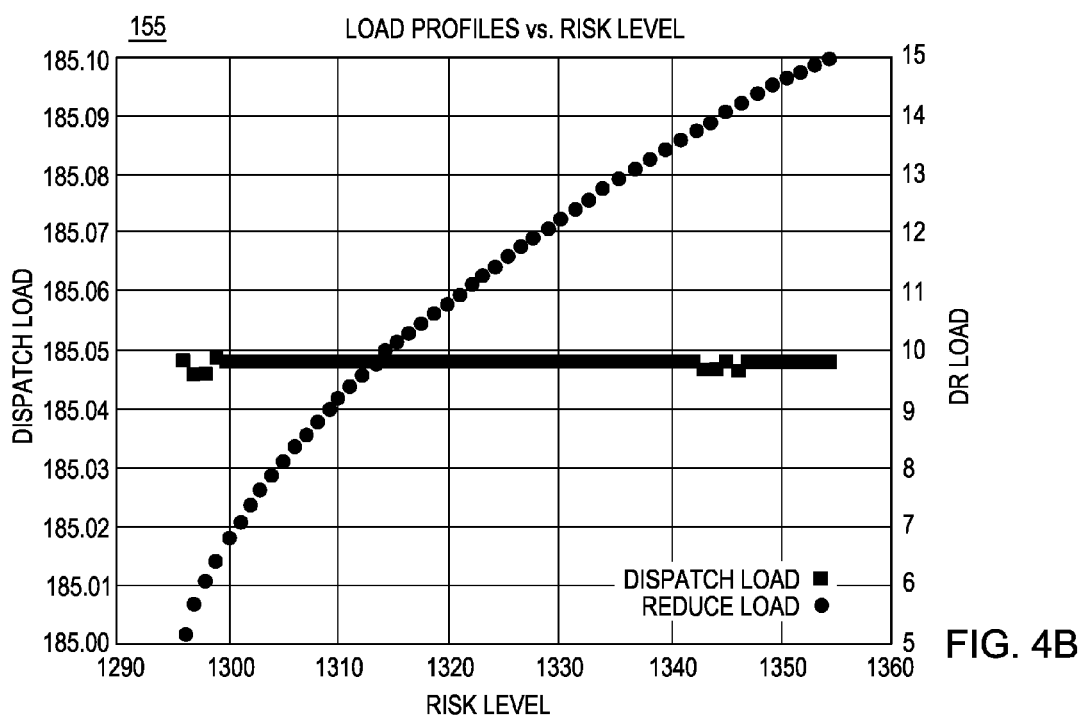
FIG. 4B shows an example plot of load profiles vs. the tolerated risk levels at an example Market Price=3 and Wind=45 according to one example numerical experiment computed for example system topology of FIG. 2.

Of the numerical examples, FIG. 4A illustrates a plot 150 of the mean cost, rebate price and load profiles as the tolerated risk levels vary and the spot market price is kept relatively low (low vs. high is relative to other costs). As seen from the plot 155, FIG. 4B, the dispatching policy and total dispatch load remains low (low vs. high is relative to capacity) for different CVaR constraints (one example measure), due to the relatively low spot market price. From these, the utility may prefers to increase load reduction incentive prices to purchase less from the spot market instead of dispatching more generation load due to the higher cost for this extra dispatching.

Figure 5:
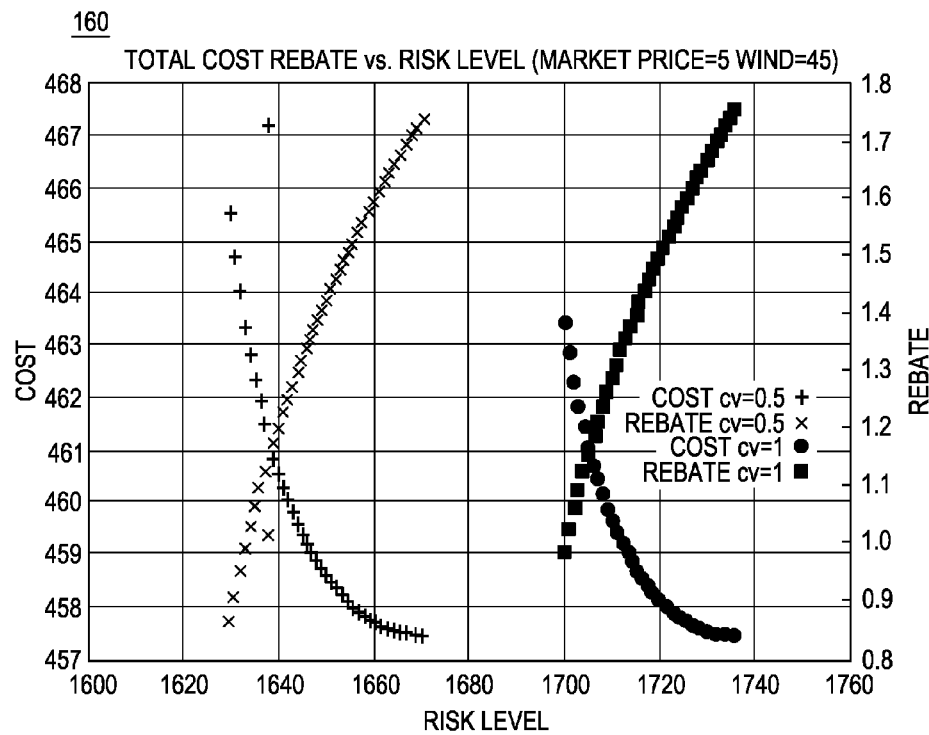
FIG. 5 shows an example plot of Loss/Rebate vs. Risk Level at various states of Market Price=5 and Wind=45 according to one example numerical experiment computed for example system topology of FIG. 2.

FIG. 5 is a plot 160 depicting the optimal rebate and the minimum cost as the tolerated risk levels vary, thus providing the efficient frontier for the cost-based loss function.

Figure 6:
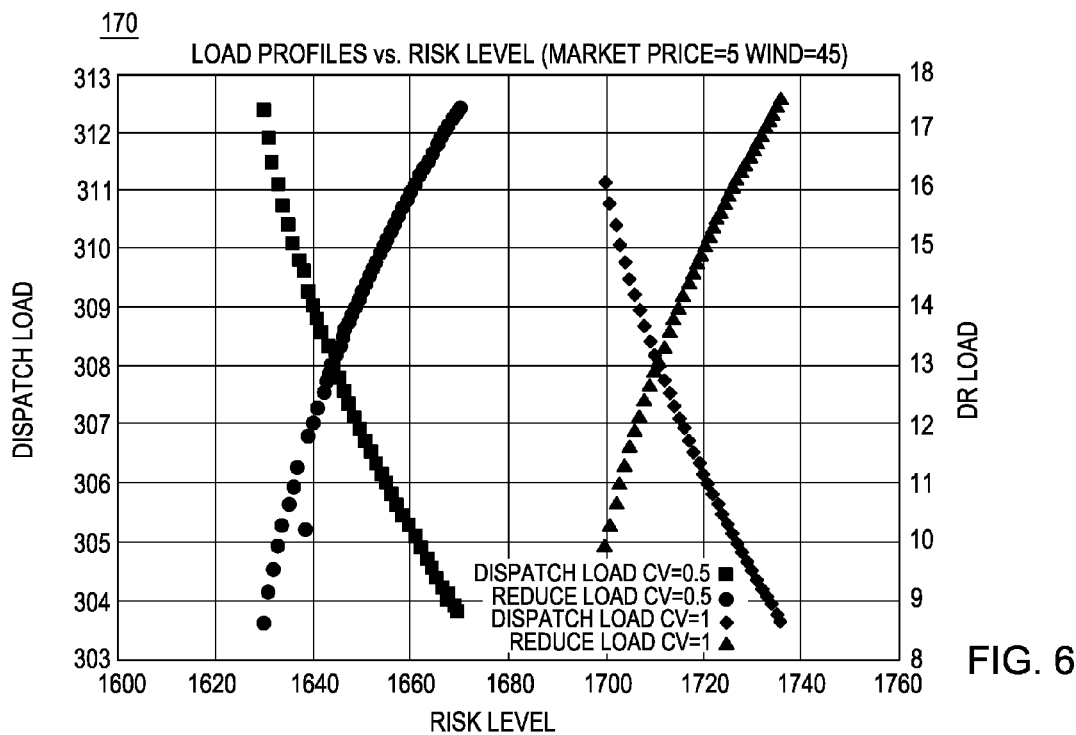
FIG. 6 shows an example plot of Load Profiles vs. Risk Level at various states of Market Price=5 and Wind=45 according to one example numerical experiment computed for example system topology of FIG. 2.

FIG. 6 is a plot 170 of the optimal total dispatching amount and demand response load reduction with respect to these risk tolerances. It is seen from FIG. 6 that with relatively high spot market prices, the utility generates (either directly from thermal sources or virtually via load reduction) and sells extra load to the market to make more profit. With a relatively loose CVaR constraint, the utility tends to pay more load reduction incentives rather than generate more energy from thermal sources.

Figure 7:
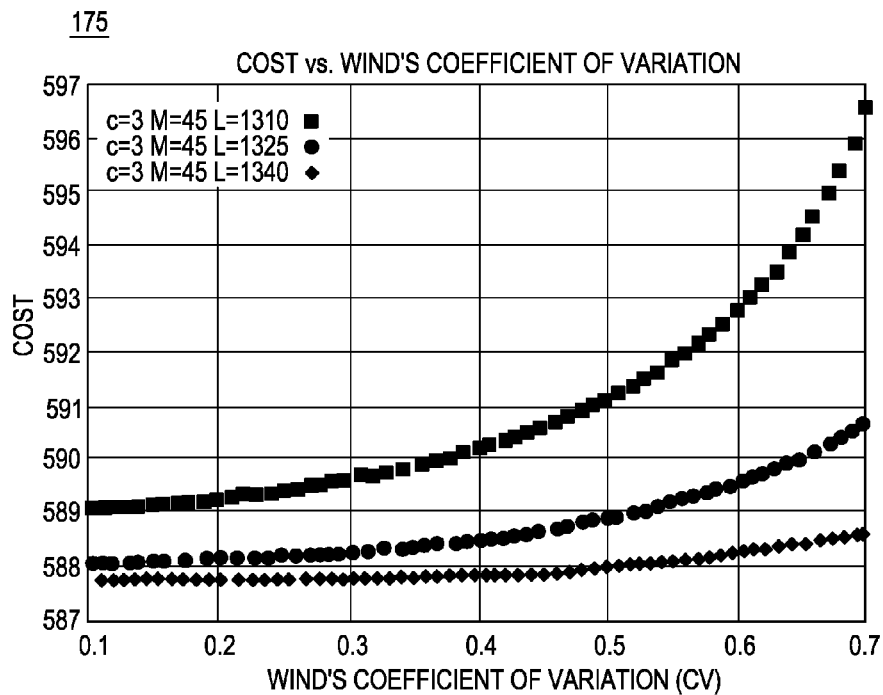
FIG. 7 shows an example plot of Loss vs. Wind's Coefficient of Variation according to one example numerical experiment computed for example system topology of FIG. 2.
Figure 8:
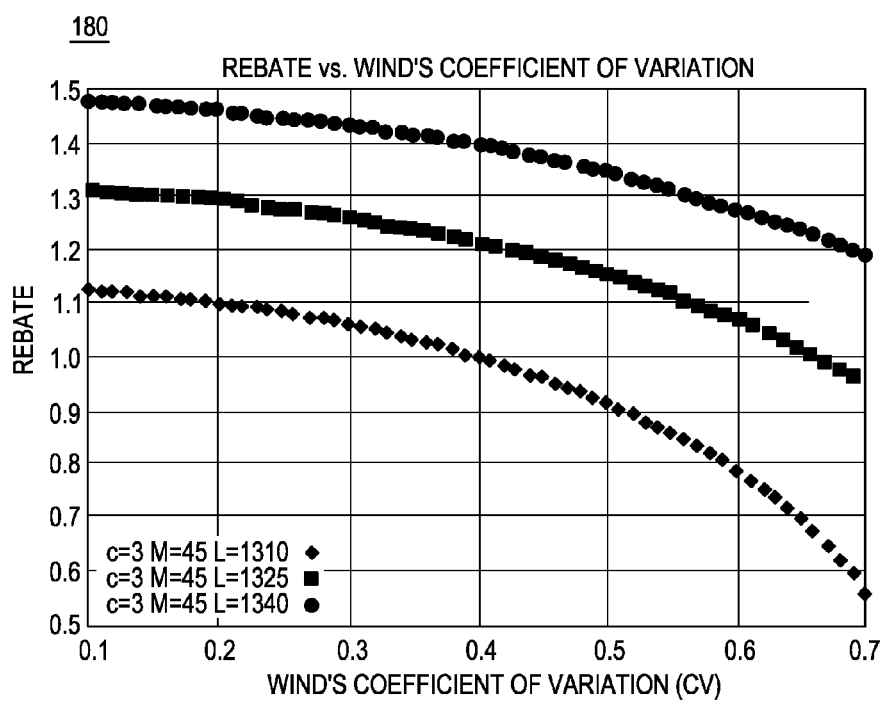
FIG. 8 shows an example plot of Rebate vs. Wind's Coefficient of Variation according to one example numerical experiment computed for example system topology of FIG. 2.

FIGS. 7 and 8 show in respective plots 175, 180 that as the coefficient of variation (CV) for wind generation increases, the mean loss increases while the rebate price decreases under the same risk constraint. This is because with the same risk constraint but a higher proportion of risk being due to wind generation, the most efficient way to keep CVaR within its prescribed limit is to reduce the risk from demand response, which in turn is achieved with a decreasing rebate. Moreover, the changes in cost and rebate are more significant with a tighter risk constraint, which follows from the risk measure in the model being quadratic in r.

Figure 9:
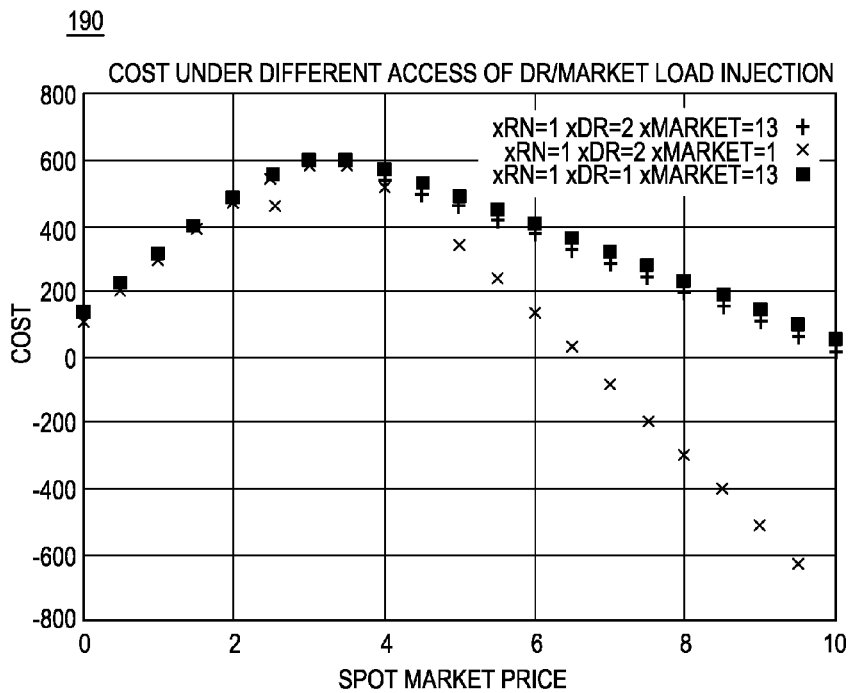
FIG. 9 illustrates the optimal cost under changing market price relations with respect to different choices for the busses that interconnect wind, DR or spot market load injections according to one example numerical experiment computed for example system topology of FIG. 2.

FIG. 9 illustrates a plot 190 of the optimal cost under changing market price relations with respect to different choices for the busses that interconnect wind, DR or spot market load injections. The optimal costs tend to increase with the spot market price at first, upon reaching a peak, and then tend to decrease because the utility can realize more profits by selling load to the market when the marginal generation cost is lower than the spot market price. In addition, a lower cost is incurred when the phase angle constraints are not active for the bus accessing the spot market or demand reduction.

Figure 10:
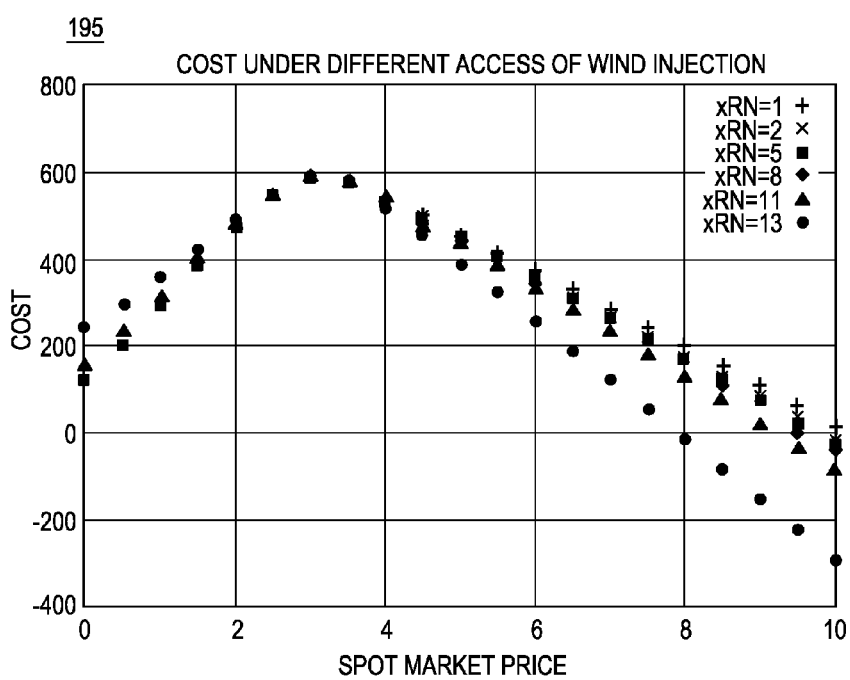
FIG. 10 is a plot that compares the optimal cost versus risk relations under different wind generation injection bus locations according to one example numerical experiment computed for example system topology of FIG. 2.

FIG. 10 is a plot 195 that compares the optimal cost versus risk relations under different wind generation injection bus locations. Lower costs are incurred when the power flow constraints are not active, or when the bus that has wind injection is also attached to a lower marginal cost generator. These results serve to illustrate and quantify the influence that the bus connections for renewable generation and spot market access can have on the resulting optimal dispatch.

The solution described assumes the existence of a feasible solution (given the constraints described), as demonstrated in the example numerical experiments. In one embodiment, the approach ensures feasibility by first considering a version of the model within the context of a robust optimization framework. Upon solving this problem, the corresponding robust optimal solution provides a lower bound on the potential benefits achievable by the utility, which the utility can decide to directly employ. On the other hand, this solution can instead be exploited to properly define a feasibility region for the original optimization problem and then apply a variant of the original solution approach taken over this feasible region. By employing this solution, the utility can further improve upon the benefits realized under the optimal solution.

The importance of capturing in the dispatching problem the effects of any renewable generation sources introduced at various nodes in the distribution network is demonstrated. Although they generate energy at essentially no operational cost, renewable sources can create issues arising from supply forecast uncertainty, where a mismatch in the planned supply and actual demand due to lower than expected renewable generation results in the utility having to purchase expensive units from the spot market.

The approach by implementing the model hedges this uncertainty by imposing a risk constraint on the objective function (total cost of meeting demand) of the dispatching problem, where a risk metric based on the Conditional Value-at-Risk of the cost function is considered. This risk constraint has the effect of slightly increasing the total dispatched generation capacity to hedge the renewable generation uncertainty. In addition or as an alternative strategy, adopt a policy to incentivize end-users to reduce their load, which can be effectuated almost instantly (as compared to increasing thermal generation) but at the expense of such incentives. The formulation also considers this strategy.

Results from numerical experiments show that the introduction of renewable sources can have a significant impact on the dispatching policy, as can the location of this injection within the transmission network. Additionally, demand response load reduction is an effective tool in controlling shortfalls created by renewable generation forecast mismatches.

In further embodiments, a variant of the formulation considers AC power flow and incorporates into the model AC power flow equations, which yields a highly non-linear stochastic optimization problem.

Thus, the system and method of the invention optimizes the utility's total financial performance by providing the ability to intelligently hedge against energy shortfalls by dispatching various energy sources, including thermal, renewables, and virtual generation, e.g., by determining the optimal dispatching policy and non-discriminate incentive rate for the utility.

Further, the system and method achieves improvements in both total financial measures and risk control over existing mechanisms that do not consider virtual generation and renewables. Moreover, the model incorporates risk-based control of renewable energy sources and demand response together with physical constraints on transmission of energy through the distribution network.

In this manner, resulting benefits include: integration of demand response as a virtual generator to hedge against the volatility and intermittency of renewable generator allows utilities to decrease the "spinning reserve" level. This is the additional reserve generation capacity from thermal sources that has to be provisioned to match any shortfall due to load or generation fluctuation (e.g. from renewables). This is a high cost saving benefit; providing a dispatching policy with risk management can provide higher coordinated, responsive control on utility's generation assets as well as the load from end-users. As shown in FIG. 1, this can be used in many levels of distribution hierarchy. Further, incentive mechanism provide significant benefits to utilities and their customers.

Figure 13:
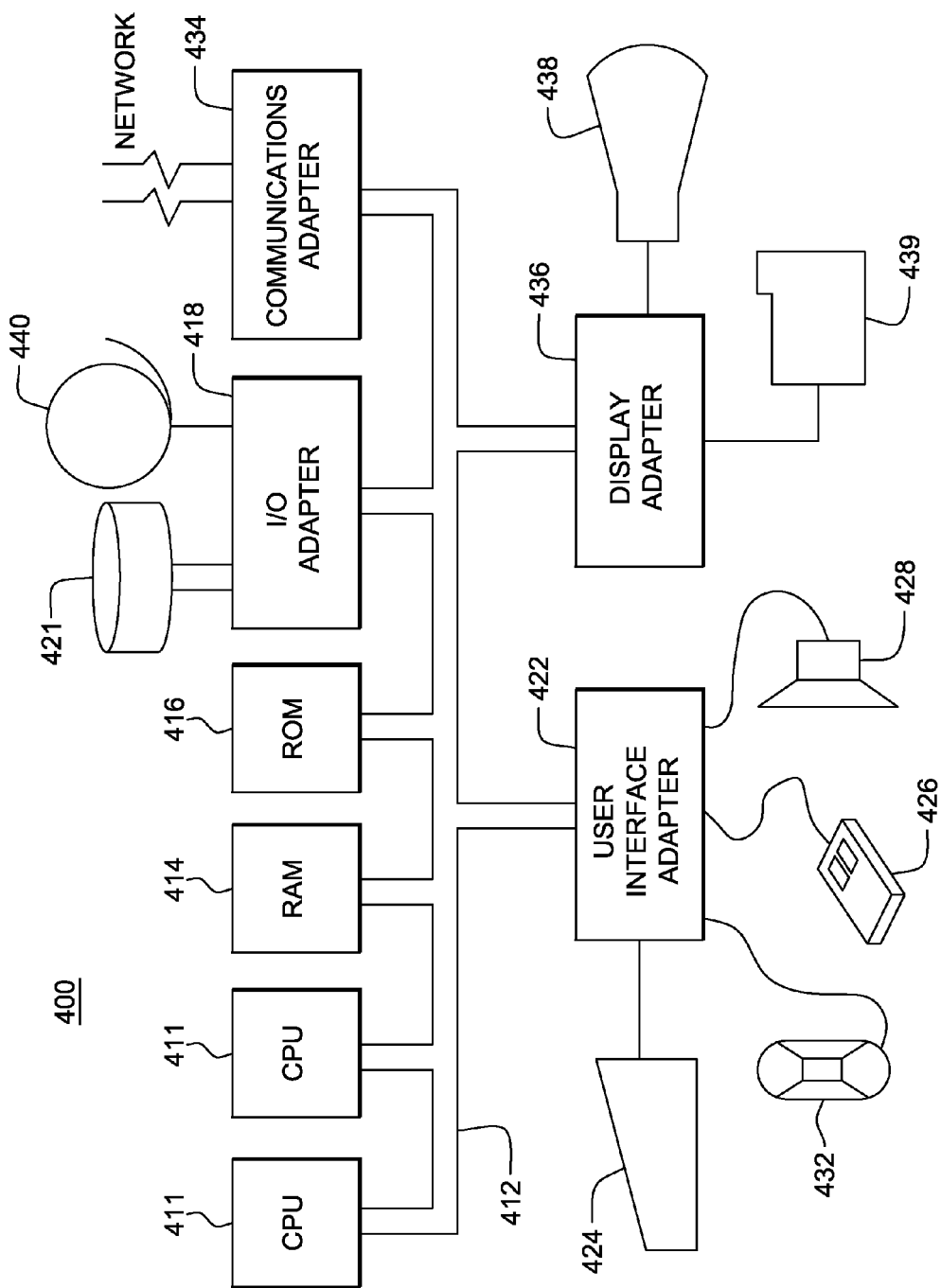
FIG. 13 depicts conceptually an example high performance computing application 400 running on a multiprocessor computing system that employs the selective pairing facility in one embodiment.

FIG. 13 illustrates an exemplary hardware configuration of a computing system 400 running and/or implementing the method steps described herein. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422

(for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the FIG.s. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

Having thus described our invention, what we claim as new, and desire to secure by Letters Patent is:

1. A computer-implemented method for managing dispatch of energy for distribution to customers of an energy utility, said method comprising:
   receiving, at a processor device, configuration data of an energy distribution network including at least one energy generator for generating energy units, and generator busses carrying energy units dispatched from said generators to customers via transmission lines,
   receiving, at a processor device, data representing a renewable energy source injected for power generation on one of said generator busses;
   specifying decision variables for controlling a dispatching of energy units from energy sources over said network and a total power extracted at connected generator busses over said network in a defined time period;
   specifying a set of optimization constraints including a risk control constraint as a function of said decision variables, said configuration data and injected energy data;
   formulating, via mixed integer programming at said processor device, an optimization problem having an a cost-based objective function representing an objective to minimize a total cost metric within an acceptable risk level;
   solving, by said processing device, said optimization problem subject to said risk control constraint, set of optimization constraints, the objective and the cost-based objective function to jointly determine an optimal dispatching policy for generated energy units and an incentive rate for customers of the utility to extract load reduction from said customers total power at connected generator busses over said network in said defined time period that minimizes said total cost metric within said acceptable risk level, said dispatching policy comprising an on/off status indicator of a generator i for each of one or more generator buses i, a real power generation $P^{g_i}$ of each generator bus i, a voltage phase angle $\theta_i$ of each bus, and an energy unit incentive rebate price r offered to customers on the one or more buses; and,
   outputting said dispatching policy and incentive rate for adoption by the utility to control energy dispatch and customer demand response.

2. The computer-implemented method as claimed in claim 1, wherein said cost-based objective function represents a sum of a utility's generation costs minus a total revenue from a load position exposed to an energy spot market, said method comprising configuring said cost-based loss function as a nonlinear mixed integer program (MIP).

3. The computer-implemented method as claimed in claim 2, wherein said solving includes implementing a gradient descent technique to solve said cost-based objective function.

4. The computer-implemented method as claimed in claim 1, wherein said output solution indicates: a dispatching order and the dispatching amount of said energy units, and in addition, said utility offering a rebate to customers according to said rebate price for reduced energy load through communicated price signals sent to customer smart meters via a generator bus for said time period.

5. The computer-implemented method as claimed in claim 1, wherein said set of optimization constraints include one or more bounding constraints on the decision variables that specify minimum and maximum limits of the a real power generation $P^{g_i}$ of each generator bus, a power (load) demand $P^{d_i}$ at each bus; and voltage phase angles $\theta_i$ limits of all busses; and, a constraint to ensure balancing of a total generation load plus the reduced load against a total demand.

6. The computer-implemented method as claimed in claim 1, wherein said set of optimization constraints include one or more power flow balance constraints on the decision variables to achieve a system level power balance when aggregating: a real load power generation output at said bus $P^{g_i}$ including injection of a renewable energy source $P_{RN}$ at a generator bus, a power demand response $P_{DR}$ as a source of virtual generation at said bus, and a real load output of $P^{g_i}$ adjustment by an amount of load bought from (sold to) said spot market at a generator bus having access to said spot market, said cost-based objective function modeled as function of decision variables z, $P^g$ and r, and random variables $P^d$, $P_{DR}(r)$ and $P_{RN}$.

7. The computer-implemented method as claimed in claim 4, further comprising: determining a risk control value within a level that is traded off against offered rebates for load reduction for said time period.

8. The computer-implemented method as claimed in claim 1, wherein a risk measure imposed by said risk constraint on the cost-based function for said optimization problem is a Conditional Value-at-Risk (CVaR), said method includes receiving a specified risk level for said risk control constraint.

9. A system for managing dispatch of energy for distribution to customers of an energy utility, said method comprising:
   a memory storage device; and
   a processor device connected to the memory storage device, said processor device configured to perform a method comprising:
      receiving configuration data of an energy distribution network including at least one energy generator for generating energy units, and generator busses carrying energy units dispatched from said generators to customers via transmission lines,
      receiving data representing a renewable energy source injected for power generation on one of said generator busses;
      specifying decision variables for controlling a dispatching of energy units from energy sources over said network and a total power extracted at connected generator busses over said network in a defined time period;
      specifying a set of optimization constraints including a risk control constraint as a function of said decision variables, said configuration data and injected energy data;
      formulating, via mixed integer programming, an optimization problem having an a cost-based objective function representing an objective to minimize a total cost metric within an acceptable risk level;
      solving said optimization problem subject to said risk control constraint, set of optimization constraints, the objective and the cost-based objective function to jointly determine an optimal dispatching policy for generated energy units and an incentive rate for customers of the utility to extract load reduction from said customers at connected generator busses over said network in said defined time period that minimizes said total cost metric within said acceptable risk level, said dispatching policy comprising an on/off status indicator of a generator i for each of one or more generator buses i, a real power generation $P^{g_i}$ of each generator bus i, a voltage phase angle $\theta_i$ of each bus, and an energy unit incentive rebate price r offered to customers on the one or more buses; and, outputting said dispatching policy and incentive rate for adoption by the utility to control energy dispatch and customer demand response.

10. The system as claimed in claim 9, wherein said cost-based objective function represents a sum of a utility's generation costs minus a total revenue from a load position exposed to an energy spot market, said method comprising configuring said cost-based loss function as a nonlinear mixed integer program (MIP).

11. The system as claimed in claim 10, wherein said solving includes implementing a gradient descent technique to solve said cost-based objective function.

12. The system as claimed in claim 9, wherein said output solution indicates: a dispatching order and the dispatching amount of said energy units, and in addition, said utility offering a rebate to customers according to said rebate price for reduced energy load through communicated price signals sent to customer smart meters via a generator bus for said time period.

13. The system as claimed in claim 9, wherein said set of optimization constraints include one or more bounding constraints on the decision variables that specify minimum and maximum limits of the a real power generation $P^{g_i}$ of each generator bus, a power (load) demand $P^{d_i}$ at each bus; and voltage phase angles $\theta_i$ limits of all busses; and, a constraint to ensure balancing of a total generation load plus the reduced load against a total demand.

14. The system as claimed in claim 9, wherein said set of optimization constraints include one or more power flow balance constraints on the decision variables to achieve a system level power balance when aggregating: a real load power generation output at said bus $P^{g_i}$ including injection of a renewable energy source $P_{RN}$ at a generator bus, and a power demand response $P_{DR}$ as a source of virtual generation at said bus, and a real load output of $P^{g_i}$ adjustment by an amount of load bought from (sold to) said spot market at a generator bus having access to said spot market, said cost-based objective function modeled as function of decision variables z, $P_g$ and r, and random variables $P^d$ $P_{DR}$ (r) and $P_{RN}$.

15. The system as claimed in claim 12, further comprising: determining a risk control value within a level that is traded off against offered rebates for load reduction.

16. The system as claimed in claim 9, wherein a risk measure imposed by said risk constraint on the cost-based function for said optimization problem is a Conditional Value-at-Risk (CVaR), said method includes receiving a specified risk level for said risk control constraint.

17. A computer program device for managing dispatch of energy for distribution to customers of an energy utility, the computer program device comprising a storage medium, said medium not a propagating signal, said medium readable by a processing circuit and storing instructions run by the processing circuit for performing a method, the method comprising:

receiving configuration data of an energy distribution network including at least one energy generator for generating energy units, and generator busses carrying energy units dispatched from said generators to customers via transmission lines, receiving data representing a renewable energy source injected for power generation on one of said generator busses;

specifying decision variables for controlling a dispatching of energy units from energy sources over said network and a total power extracted at connected generator busses over said network in a defined time period;

specifying a set of optimization constraints including a risk control constraint as a function of said decision variables, said configuration data and injected energy data;

formulating, via mixed integer programming, an optimization problem having an a cost-based objective function representing an objective to minimize a total cost metric within an acceptable risk level;

solving said optimization problem subject to said risk control constraint, set of optimization constraints, the objective and the cost-based objective function to jointly determine an optimal dispatching policy for generated energy units and an incentive rate for customers of a utility to extract load reduction from said customers at connected generator busses over said network in said defined time period that minimizes said total cost metric within said acceptable risk level, said dispatching policy comprising an on/off status indicator of a generator i for each of one or more generator buses i, a real power generation $P^{g_i}$ of each generator bus i, a voltage phase angle $\theta_i$ of each bus, and an energy unit incentive rebate price r offered to customers on the one or more buses; and, outputting said dispatching policy and incentive rate for adoption by an utility to control energy dispatch and customer demand response.

18. The computer program device as claimed in claim 17, wherein said cost-based objective function represents a sum of a utility's generation costs minus a total revenue from a load position exposed to an energy spot market, said method comprising configuring said cost-based loss function as a nonlinear mixed integer program (MIP).

19. The computer program device as claimed in claim 18, wherein said solving includes implementing a gradient descent technique to solve said cost-based objective function.

20. The computer program device as claimed in claim 19, wherein said output solution indicates: a dispatching order and the dispatching amount of said energy units, and in addition, said utility offering a rebate to customers according to said rebate price for reduced energy load through communicated price signals sent to customer smart meters via a generator bus for said time period.

21. The computer program device as claimed in claim 20, further comprising: determining a risk control value within a level that is traded off against offered rebates for load reduction for said time period.

* * * * *